(No Model.)

J. McARTHUR.
PLOW.

No. 379,653. Patented Mar. 20, 1888.

Witnesses
Albert Speiden
Alfred T. Gage

John McArthur Inventor,
By his Attorney - Henry N Copp

UNITED STATES PATENT OFFICE.

JOHN McARTHUR, OF WALLACE, KANSAS.

PLOW.

SPECIFICATION forming part of Letters Patent No. 379,653, dated March 20, 1888.

Application filed December 9, 1887. Serial No. 257,462. (No model.)

*To all whom it may concern:*

Be it known that I, JOHN MCARTHUR, a citizen of the United States, residing at Wallace, in the county of Wallace and State of Kansas, have invented certain new and useful Improvements in Plows; and I do hereby declare the following to be a full, clear, and exact description of the invention, such as will enable others skilled in the art to which it appertains to make and use the same.

My invention relates to plows, and has for its object to provide a mold-board which will be light and strong, simple and durable, easily applied and detached, and which will effectually turn the sod without permitting it to pass to the plow-handles.

It has further for its object to combine with the tapering rolls forming the mold-board adjustable scrapers, as hereinafter described, whereby the rolls are kept clean or free from adhering dirt.

To the accomplishment of the above objects and such others as may hereinafter appear the invention consists in the construction and the combination of parts, hereinafter particularly described and claimed, reference being had to the accompanying drawings, forming a part hereof.

Figure 1:
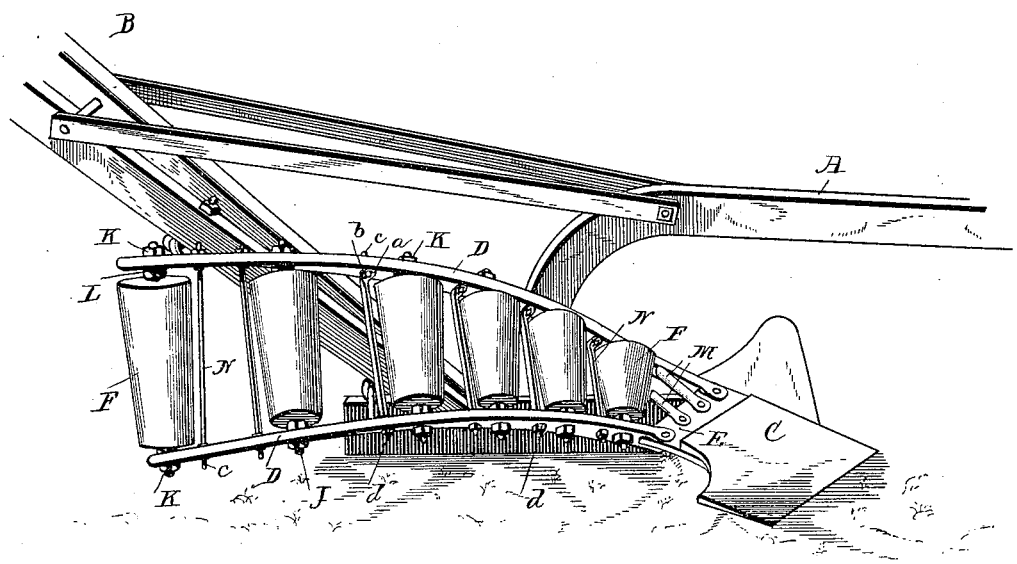
Figure 2:
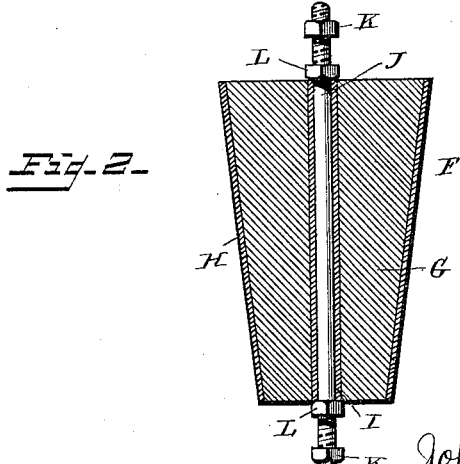

Figure 1 is a perspective of the plow; Fig. 2, a longitudinal section through one of the rolls, the bolt or axle being in full lines.

In the drawings, the letter A designates the plow-beam, B the handles, and C the point and share. The mold-board is composed of the curved bars D, bolted or otherwise firmly secured at their lower ends to the plate E and extending rearwardly with the inclination shown, so that the rolls F will lie at such angles to a horizontal that those at the rear end of the bars or frame will have a more upright position than those at the forward or lower end, the rolls gradually assuming a more upright position from the front to the rear of the bars or frame. By such arrangement the rolls will receive the sod on a more nearly horizontal position as it leaves the share and gradually lift it to a vertical or nearly vertical position as it is carried to the rear. The rolls, which practically form the surface of the mold-board, are made to taper from their upper to their lower ends, so that as the sod passes over them the enlarged upper ends of the rolls will push the upper edge of the sod outward, so that by the time the sod reaches the last or most nearly upright roll its upper edge will have been pushed outward beyond the lower edge, and the sod thus caused to fall with its face downward. The tapering of the rolls and their gradual approach to an upright position both combine to completely turn the sod over and prevent it from moving up to the handles.

In order to combine lightness, strength, and durability in the rolls, they are formed of a central tapering core, G, of wood, covered with a tapering shell, H, of, preferably, cast metal incasing it, the core being forced into the casing, so that the two will securely hold together. The core is formed with a bore running longitudinally through it, in which is fitted a metallic tube, I. Through this tube passes a rod or bolt, J, which is threaded at both ends and extended through the upper and lower bars D, and having nuts K and L applied to the threaded portions both inside and outside of the bars D, so as to clamp the bolts and the bars together, the nuts L also serving as washers between the rolls and the bars D of the frame. The rolls are free to turn on the bolts J, which form axles therefor. The outside casing of the roll gives all the strength and durability of a solid metal roll, while the wooden core imparts lightness to the roll and prevents the sod and soil from entering the casing, as it would if the core were not used. The bolts not only serve as axles for the rolls, but also serve to brace the bars or frame, and the nuts L, besides serving as washers, also serve to exclude soil from entering the metal tube which serves as the boxing to the axles or bolts.

Between the share C and the first roll are a series of fingers, M, which serve to bridge the space between the share and first roll and to guide the sod onto that roll.

In order to keep the rolls free from adhering dirt, I place alongside each roll a scraper, N, which is formed of comparatively thin but stiff metal and provided with bent ends a, which are made with slots b, through which pass bolts c, held to the bars D by nuts d. The slots in the bent ends permit the scrapers to be adjusted to or from the rolls, as may be necessary or desirable, owing to the nature or character of the soil being plowed.

As will be observed, the parts are each simple in construction and yet strong and durable, and combine lightness and efficiency with strength, and can be applied to plows already in use as well as to plows being constructed, and, if desired, can be easily and quickly detached from the plow.

Having described my invention and set forth its merits, what I claim is—

1. The combination, with the rearwardly-extending bars D, the bolts J, and the tapering rolls F, loosely journaled on said bolts, of the scrapers N, having bent and slotted ends, and bolts c, connecting said scrapers adjustably to the bars D, substantially as and for the purposes set forth.

2. The combination, with the rearwardly-extending bars and the bolts connecting the same, of the tapering rolls composed of metallic exterior and wooden core mounted on said bolts, and the nuts securing the bolts to said bars and serving as washers, substantially as described.

In testimony whereof I affix my signature in presence of two witnesses.

JOHN McARTHUR.

Witnesses:
FREDERICK H. RUDD,
DENIS SULLIVAN.